United States Patent
Iizawa et al.

(10) Patent No.: US 9,430,489 B2
(45) Date of Patent: Aug. 30, 2016

(54) COMPUTER, DATA STORAGE METHOD, AND INFORMATION PROCESSING SYSTEM

(71) Applicant: FUJITSU LIMITED, Kawasaki-shi, Kanagawa (JP)

(72) Inventors: Ken Iizawa, Yokohama (JP); Toshihiro Ozawa, Yokohama (JP); Yasuo Noguchi, Kawasaki (JP); Kazuichi Oe, Yokohama (JP); Munenori Maeda, Yokohama (JP); Kazutaka Ogihara, Hachiojl (JP); Masahisa Tamura, Kawasaki (JP); Tatsuo Kumano, Kawasaki (JP); Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 630 days.

(21) Appl. No.: 13/850,379

(22) Filed: Mar. 26, 2013

(65) Prior Publication Data

US 2013/0311430 A1    Nov. 21, 2013

(30) Foreign Application Priority Data

May 17, 2012    (JP) ................. 2012-113466

(51) Int. Cl.
  *G06F 7/00*    (2006.01)
  *G06F 17/30*   (2006.01)
  *G06F 11/16*   (2006.01)
  *G06F 11/20*   (2006.01)

(52) U.S. Cl.
  CPC ........ *G06F 17/3015* (2013.01); *G06F 11/1662* (2013.01); *G06F 11/2035* (2013.01); *G06F 11/2094* (2013.01); *G06F 17/30575* (2013.01); *G06F 11/2046* (2013.01); *G06F 11/2048* (2013.01)

(58) Field of Classification Search
  CPC ............ G06F 17/3015; G06F 11/1662; G06F 11/2094; G06F 11/2035; G06F 17/30575; G06F 11/2048; G06F 11/2046
  See application file for complete search history.

(56) References Cited

U.S. PATENT DOCUMENTS

| | | | |
|---|---|---|---|
| 2007/0220059 A1* | 9/2007 | Lu | ..................... G06F 17/30368 |
| 2009/0132621 A1* | 5/2009 | Jensen | .................... G06F 3/061 |
| 2010/0106907 A1 | 4/2010 | Noguchi et al. | |

FOREIGN PATENT DOCUMENTS

| | | |
|---|---|---|
| JP | H03191443 (A) | 8/1991 |
| JP | 2010-97385 | 4/2010 |

OTHER PUBLICATIONS

Japanese Office Action dated Jan. 5, 2016 in corresponding Japanese Patent Application No. 2012-113466 (4 pages) (2 pages English Translation).

* cited by examiner

*Primary Examiner* — Usmaan Saeed
*Assistant Examiner* — Paul Kim
(74) *Attorney, Agent, or Firm* — Staas & Halsey LLP

(57) ABSTRACT

A computer includes a memory that stores a program and received data; and a processor that executes an operation by executing the program stored in the memory, the operation including storing the received data into a first database having a first data structure in which reading is performed in a random access manner and writing is performed in a sequential access manner, when the received data is received from a second apparatus is as same as data stored in a first apparatus which has a failure, and copying the received data stored in the first database to a second database having a second data structure in which reading is performed in a sequential access manner and writing is performed in a random access manner.

18 Claims, 18 Drawing Sheets

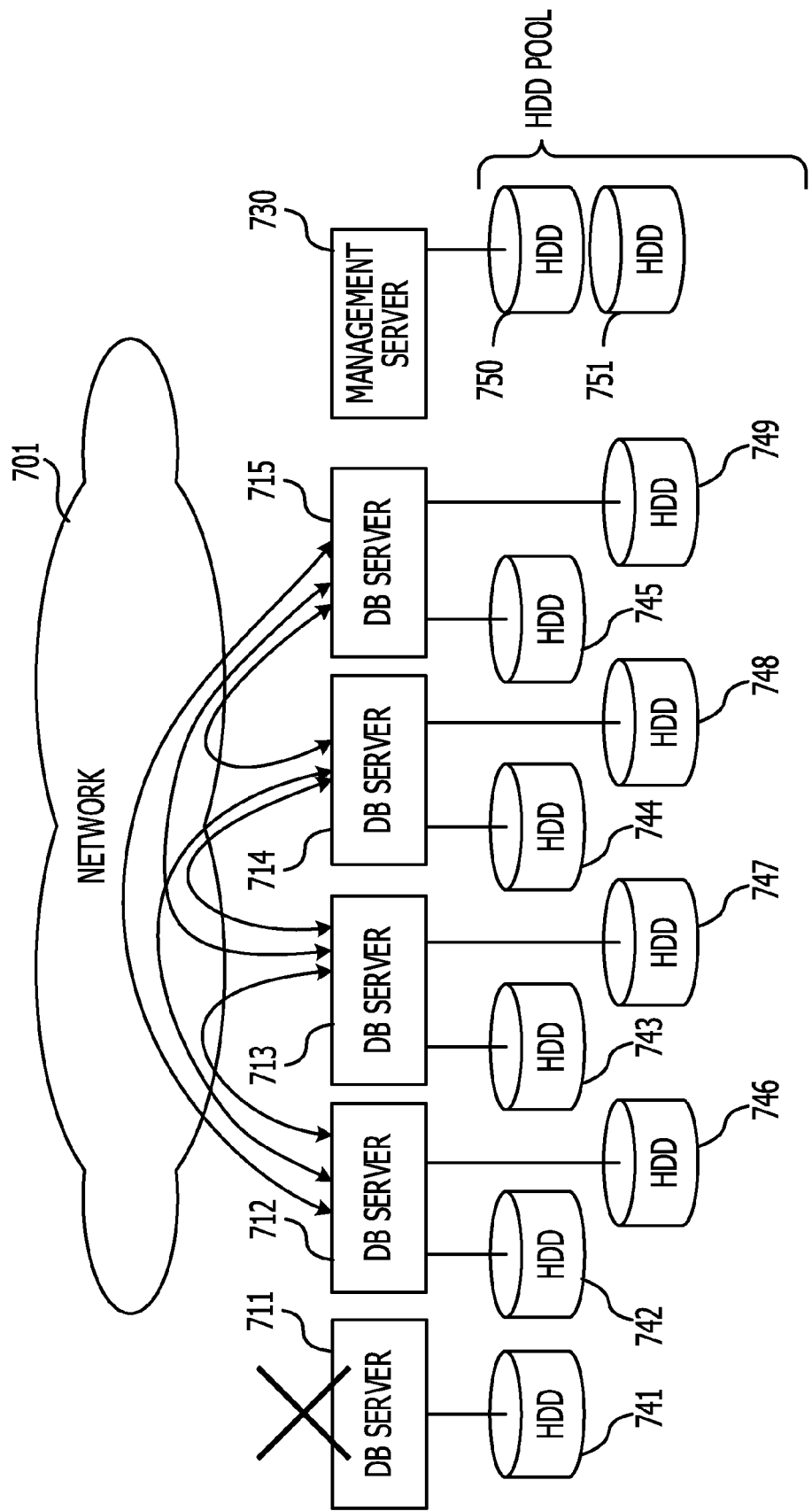

COMPUTER, DATA STORAGE METHOD, AND INFORMATION PROCESSING SYSTEM

CROSS-REFERENCE TO RELATED APPLICATION

This application is based upon and claims the benefit of priority of the prior Japanese Patent Application No. 2012-113466 filed on May 17, 2012, the entire contents of which are incorporated herein by reference.

FIELD

The embodiments discussed herein are related to a computer, a data storage method, and an information processing system.

BACKGROUND

Recently, many distributed storage systems have been employed as an infrastructure in a business field in which high availability is desirable. For example, in client/server distributed storage systems, a client writes data into multiple servers or reads out data stored in a server. On the server side, multiple servers cooperate with each other, and store data in a redundant manner in preparation for a failure. For example, one server stores data, and another server stores the same data.

In such systems, when a failure occurs in a server, the redundancy of the data stored in a database of the failure server is reduced. Accordingly, when a failure occurs in a server, a recovery process is performed to restore the redundancy of the data in a database that had been managed by the failure server. In the recovery process, to suppress the reduction of the redundancy of the data, a server that stores the data (that is, a transfer-source server) transfers a copy of the data to a server that is newly selected (that is, a transfer-destination server). Thus, the redundancy of the data stored in the failure server is restored. Examples of a technique regarding a recovery process include a technique for enabling reduction in a time period in which data access is stopped when a failure occurs in a storage apparatus.

A technique of the related art is disclosed, for example, in Japanese Laid-open Patent Publication No. 2010-97385.

SUMMARY

According to an aspect of the invention, a computer includes a memory that stores a program and received data; and a processor that executes an operation by executing the program stored in the memory, the operation including storing the received data into a first database having a first data structure in which reading is performed in a random access manner and writing is performed in a sequential access manner, when the received data is received from a second apparatus is as same as data stored in a first apparatus which has a failure, and copying the received data stored in the first database to a second database having a second data structure in which reading is performed in a sequential access manner and writing is performed in a random access manner The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a diagram illustrating an exemplary operation state in a server system after an additional HDD is allocated in the third embodiment.

DESCRIPTION OF EMBODIMENTS

A recovery process may take time due to the data structure of a database. For example, data structures of databases are classified into the fast-write type having data placement in which data is efficiently written, and the fast-read type having data placement in which data is effectively read out. A server that manages a fast-read database among these types takes time for writing data which is longer than that for writing data into a fast-write database. Thus, the recovery time is longer. A server during recovery has not yet completed the recovery, and the slot stored in the database has low redundancy. Occurrence of another failure in the server during recovery causes data loss. That is, a system having a fast-read database takes a longer time for recovery, resulting in high possibility of data loss and thus in reduced reliability.

Embodiments will be described below with reference to the drawings.

First Embodiment

A first embodiment will be described with reference to FIG. 1.

Figure 1:
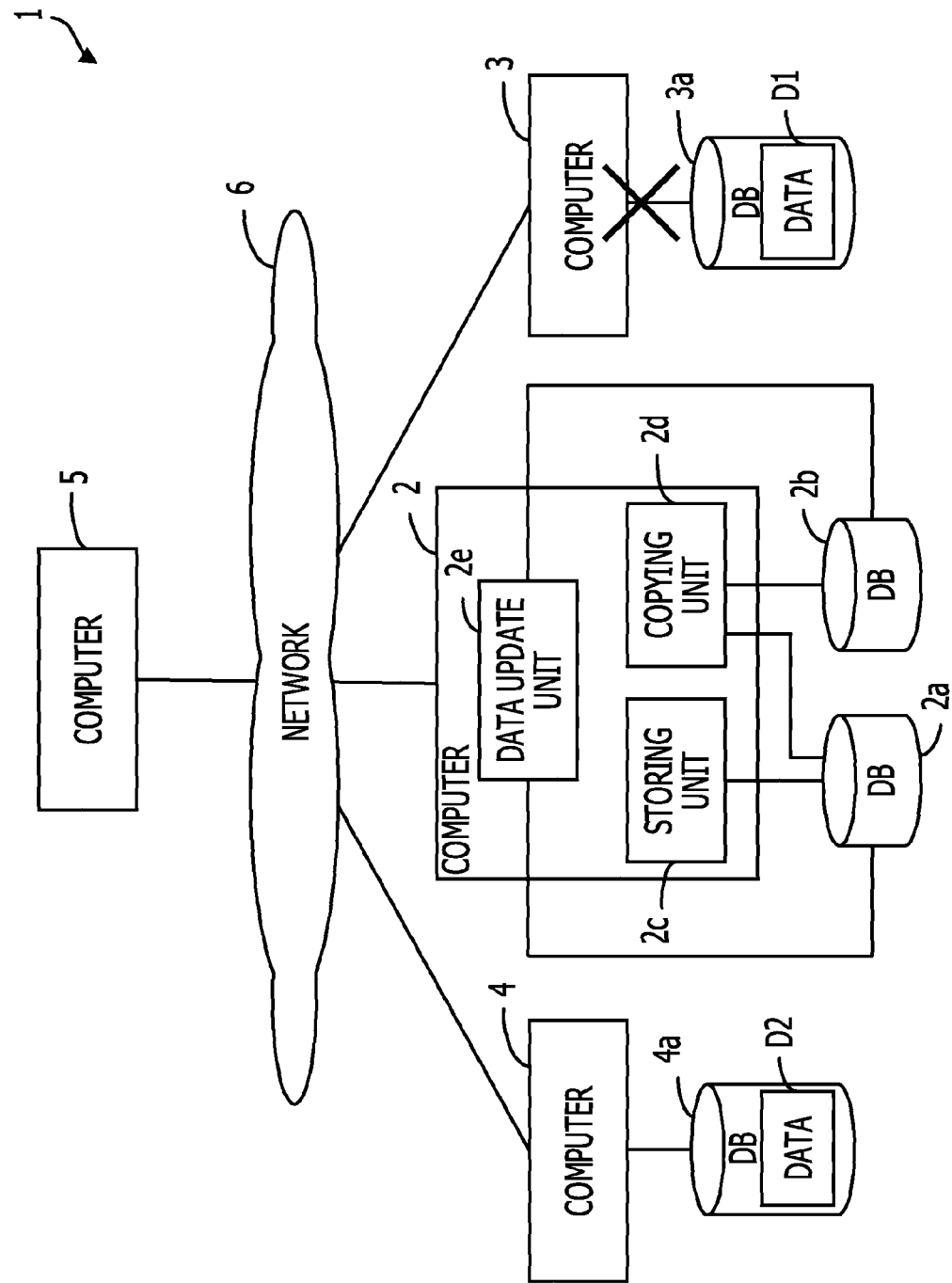
FIG. 1 is a diagram illustrating an exemplary information processing system including computers according to a first embodiment.

FIG. 1 is a diagram illustrating an exemplary information processing system including computers according to the first embodiment.

As illustrated in FIG. 1, in an information processing system 1, computers 2 to 5 are coupled via a network 6 so as to communicate with each other.

The computer 2 includes a database (DB) 2a and a DB 2b. The DBs 2a and 2b are exemplary storage units. The DB 2a has a data structure in which data is read in a random access manner and is written in a sequential access manner. The DB 2b has a data structure in which data is written in a random access manner and is read in a sequential access manner. The sequential access is more efficient than the random access. Therefore, the DB 2a is capable of writing data more efficiently than the DB 2b. The computer 2 includes a storing unit 2c, a copying unit 2d, and a data update unit 2e.

Upon reception of the same data as data that had been stored in the failure computer 3 from the computer 4, the storing unit 2c stores the received data into the DB 2a which is capable of writing data more efficiently than the DB 2b. The same data as data that had been stored in the failure computer 3 is, for example, copy data of data having no redundancy.

The DB 2b has, for example, a fast-read data structure. The DB 2a has, for example, a fast-write data structure. A DB having a fast-read data structure is, for example, a DB having a structure in which, when an object is updated, old data at the in-place location is overwritten with new data for the update. A DB having a fast-write data structure is, for example, a DB having a structure (log structure) in which, when an object is updated, new data for the update is written at the end of the DB.

The copying unit 2d copies data stored in the DB 2a to the DB 2b. For example, when the computer 2 is to manage, on behalf of the computer 3, some pieces of the data that had been stored in the computer 3, the copying unit 2d starts copying the pieces of data after all of the pieces of data to be managed are stored in the DB 2a.

Upon reception of an update request for data that is stored in the DB 2a and that has not been copied to the DB 2b, the data update unit 2e writes new data with which the existing data is to be updated and which is included in the update request into the DB 2b. The data update unit 2e deletes the data in the DB 2a which is specified by the update request.

A central processing unit (CPU) included in the computer 2 performs a data storing program, whereby the functions of the storing unit 2c and the copying unit 2d of the computer 2 are achieved.

The computers 3 and 4 may have a configuration similar to the above-described configuration of the computer 2. In the example in FIG. 1, the computer 3 has a DB 3a storing data D1. The computer 4 has a DB 4a storing data D2. The data D2 is the same data as the data D1. That is, data in the system illustrated in FIG. 1 is managed in a redundant manner as in data D1 and data D2. The computer 5 accesses data stored in the DBs included in the computers 2 to 4 via the network 6.

The write mechanism and the readout mechanism of the DBs 2a and 2b included in the computer 2 will be described with reference to FIG. 2. In the description below, the computer 5 accesses the DBs managed by the respective computers 2 to 4 on an object-by-object basis. An object is an exemplary data-management unit. That is, the computer 5 specifies an object to be written/read, by using an object ID. An object ID is determined by the computer 5 when an object is to be created.

Figure 2:
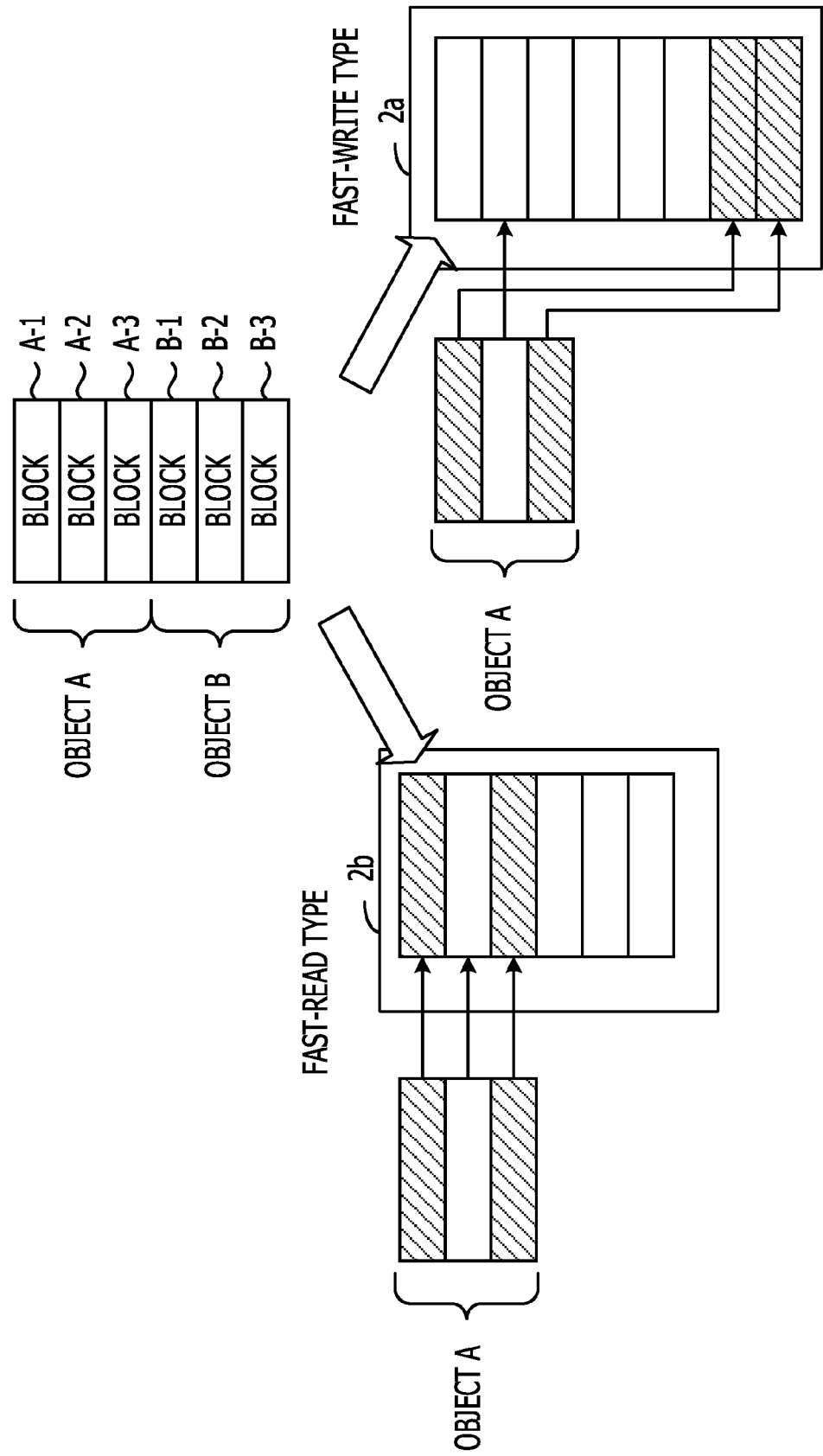
FIG. 2 is a schematic diagram illustrating an exemplary data write mechanism according to the first embodiment.

FIG. 2 is a schematic diagram illustrating an exemplary data write mechanism according to the first embodiment. The object layout in the DBs 2a and 2b is illustrated in the upper part of FIG. 2. The write mechanism of the DB 2b in which data is stored in the fast-read data structure is illustrated in the lower left part of FIG. 2. The write mechanism of the DB 2a in which data is stored in the fast-write data structure is illustrated in the lower right part of FIG. 2.

In the example in FIG. 2, each of the DBs 2a and 2b stores objects A and B which have blocks arrayed therein, for example, on a disk. The object A has blocks A-1, A-2, and A-3. Each of the blocks A-1, A-2, and A-3 contains data. Similarly, the object B has blocks B-1, B-2, and B-3. Each of the blocks B-1, B-2, and B-3 contains data.

Assume that data in the blocks A-1 and A-3 in the object A is updated.

When the object A for the update is written into the fast-read DB 2b, the computer 2 uses a random access method to directly access the location at which the object A is written and which is specified on the basis of, for example, index position information, and writes the object A. In contrast, when the object A is read out from the DB 2b, a sequential access method is used to read out the blocks A-1, A-2, and A-3 of the object A from the top in sequence. Thus, in the DB 2b, the object A is written by performing random access to each of the blocks, whereas the object A is read out by performing sequential access to the subsequent blocks. A DB is accessed in a sequential access manner more effectively than in a random access manner. That is, the readout mechanism of the DB 2b is more efficient than the write mechanism of the DB 2b.

In the fast-read DB 2b, in the case of addition of new data (object), not update of data (object), data (objects) is rearranged so that readout is performed in sequence. For example, data (objects) is sorted in ascending order of the identifier number of data (object). Thus, even addition of new data (object) to the fast-read DB 2b is not sequential writing.

When the object A for the update is written into the fast-write DB 2a, the computer 2 writes the object A into an empty area at the end of the disk. In contrast, when the object A is read out from the DB 2a, the computer 2 uses a random access method to directly access the location at which the object A is written and which is specified on the basis of, for example, the position information, and reads out the blocks A-1, A-2, and A-3 of the object A. Thus, in the DB 2a, the object A is written by performing sequential access to the subsequent blocks, whereas the object A is read out by performing random access to each of the blocks. That is, the write mechanism of the DB 2a is more efficient than the readout mechanism of the DB 2a. The DB 2a is more efficient in writing than the DB 2b.

A data storage method performed in the information processing system 1 including the computer 2 having such a configuration will be described.

The computer 3 stores the data D1 in the DB 3a, and causes the DB 4a of the computer 4 to store the data D2 in advance which is the same data as the data D1, thereby achieving redundant data.

When a failure occurs in the computer 3, the computers 2 and 4 detect the occurrence of the failure. For example, each of the computers 2 to 4 regularly performs normality-or-failure monitoring on other computers. The normality-or-failure monitoring is a process in which it is regularly checked whether or not other computers in the system normally operate.

The computer 4 stores the data D2 which is the same as the data D1 in the failure computer 3, and transmits the same data as the data D2 to the computer 2. The transmitted data is also the same as the data D1.

Upon reception of the same data as the data D1 from the computer 4, the storing unit 2c of the computer 2 stores the received data into the DB 2a which is capable of writing data efficiently. The copying unit 2d copies the data stored in the DB 2a by the storing unit 2c to the DB 2b.

Figure 3:
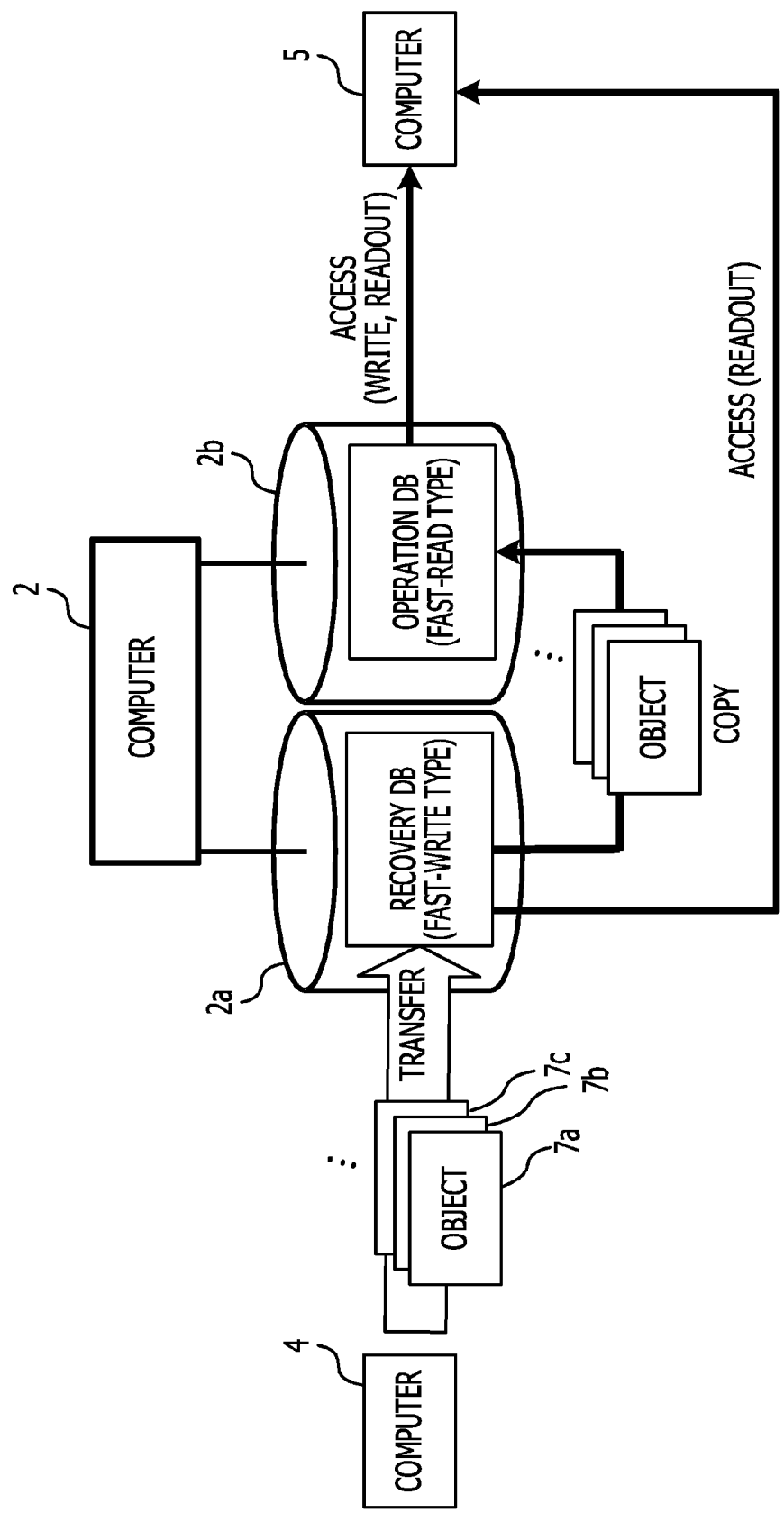
FIG. 3 is a diagram illustrating an exemplary storage state of redundant data according to the first embodiment.

FIG. 3 is a diagram illustrating an exemplary storage state of redundant data according to the first embodiment. The example in FIG. 3 is an example of the case where data is written on an object-by-object basis. Objects 7a, 7b, 7c, and so forth that are the same as the objects stored in the failure computer 3 are transferred from the computer 4 to the computer 2. The storing unit 2c writes the transferred objects 7a, 7b, 7c, and so forth into the DB 2a. The DB 2a is a DB having a fast-write data structure. Thus, the objects 7a, 7b, 7c, and so forth are efficiently written into the DB 2a, for example, in a sequential access manner. At the time point when the transfer of the objects 7a, 7b, 7c, and so forth from the computer 4 to the computer 2 is completed, the redundancy of the objects 7a, 7b, 7c, and so forth is restored.

Upon completion of the writing of the objects 7a, 7b, 7c, and so forth into the DB 2a, the copying unit 2d copies the objects 7a, 7b, 7c, and so forth to the DB 2b. The DB 2b has a fast-read data structure, in which, for example, writing is performed in a random access manner. Upon completion of the copying of the objects 7a, 7b, 7c, and so forth, for example, all of the objects 7a, 7b, 7c, and so forth in the DB 2a are deleted. Thus, after that, the DB 2a may be used for usage other than recovery, achieving effective resource utilization.

Even during a recovery process, the computer 2 is capable of receiving access from the computer 5. For example, after the objects 7a, 7b, 7c, and so forth are stored into the DB 2a, before the objects 7a, 7b, 7c, and so forth are copied to the DB 2b, when the computer 5 performs readout access on either one of the objects 7a, 7b, 7c, and so forth, the corresponding object is read out from the DB 2a. After the objects 7a, 7b, 7c, and so forth are stored into the DB 2a, before the objects 7a, 7b, 7c, and so forth are copied to the DB 2b, when the computer 5 performs write access for update on either one of the objects 7a, 7b, 7c, and so forth, the data with which the object is to be updated is written into the DB 2b. In this case, the object that has not been updated and that is stored in the DB 2a is deleted, and is not regarded as a target to be copied. Thus, the efficiency of the copy process is improved.

After the objects 7a, 7b, 7c, and so forth are copied to the DB 2b, when the computer 5 performs write or readout access on either one of the objects 7a, 7b, 7c, and so forth, the DB 2b is accessed.

Thus, upon reception of the data D2 which is the same as the data D1 stored in the failure computer 3 from the computer 4, the computer 2 in the information processing system 1 stores the received data into the DB 2a which enables more efficient writing than the DB 2b. After that, data stored in the DB 2a is copied to the DB 2b.

Thus, the data D2 which is the same as the data D1 stored in the failure computer 3 is rapidly stored into the DB 2a of the computer 2, achieving rapid restore of the redundancy of data. This suppresses occurrence of data loss, resulting in suppression of reduction in reliability.

Second Embodiment

A second embodiment will be described. The second embodiment employs a larger-scale client/server distributed storage system according to the first embodiment in which the reduction in reliability is suppressed upon a server failure.

In the second embodiment, each of servers which manage databases manages data on an object-by-object basis. Servers group the objects to address a server failure. Hereinafter, a group of objects is called a slot. Servers 2 to 4 cooperate with each other, and provide data redundancy for each of slots by using a technique of, for example, the mirroring.

In such a system, one failure server causes reduction in the redundancy of the slots stored in a DB of the failure server. To suppress the reduction in the redundancy of the slots, recovery is performed in which data regarding the slots is transferred from the servers (transfer-source servers) that store the slots to the servers (transfer-destination servers) that are newly selected.

A server system according to the second embodiment will be described with reference to FIG. 4.

Figure 4:
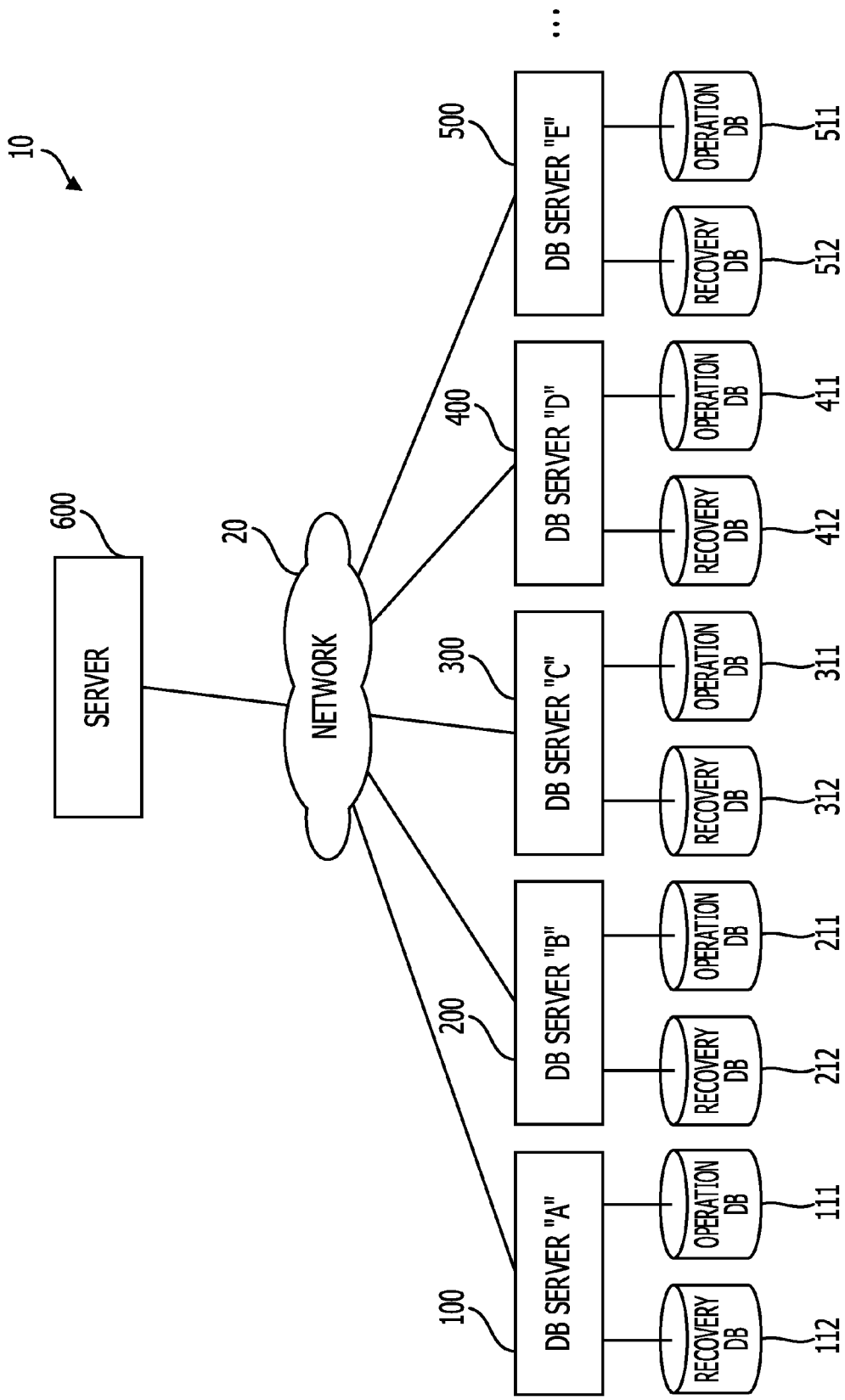
FIG. 4 is a diagram illustrating an exemplary server system according to a second embodiment.

FIG. 4 is a diagram illustrating an exemplary server system according to the second embodiment. As illustrated in FIG. 4, in a server system 10, DB servers 100, 200, 300, 400, 500, and so forth, and a server 600 are coupled via a network 20 so as to communicate with each other.

The DB servers 100, 200, 300, 400, 500, and so forth have DBs, and manage data in the DBs. The DB servers 100, 200, 300, 400, and 500 have operation DBs 111, 211, 311, 411, and 511, respectively. The DB servers 100, 200, 300, 400, and 500 have recovery DBs 112, 212, 312, 412, and 512, respectively. The operation DBs 111, 211, 311, 411, and 511 stores data in a fast-read data structure. The recovery DBs 112, 212, 312, 412, and 512 stores data in a fast-write data structure. The detail of the operation DBs 111, 211, 311, 411, and 511 and the recovery DBs 112, 212, 312, 412, and 512 will be described below.

Each of the DB servers 100, 200, 300, 400, 500, and so forth described above regularly transmits a signal (for example, a heartbeat) indicating that the server normally operates, via the network 20 to the other servers, thereby monitoring the operating conditions of the other servers. An identifier is assigned to each of the DB servers 100, 200, 300, 400, 500, and so forth, and the DB servers 100, 200, 300, 400, 500, and so forth are uniquely identified by using the identifiers in the server system 10. In the example in FIG. 4, the identifier of the DB server 100 is "A"; the DB server 200, "B"; the DB server 300, "C"; the DB server 400, "D"; and the DB server 500, "E".

The server 600 accesses the DBs managed by the DB servers 100, 200, 300, 400, 500, and so forth via the network 20. For example, the server 600 is a Web server. The server 600 which functions as a Web server is coupled to terminals used by users via a network. The server 600 accesses the DBs managed by the DB servers 100, 200, 300, 400, 500, and so forth in accordance with requests from the terminals. The server 600 serves as a client from the viewpoint of the DB servers 100, 200, 300, 400, 500, and so forth.

In FIG. 4, five servers 100, 200, 300, 400, and 500 which function as a DB server are illustrated. However, more than five servers which function as a DB server may be used.

An exemplary hardware configuration of the DB server 100 included in the server system 10 will be described by using FIG. 5.

Figure 5:
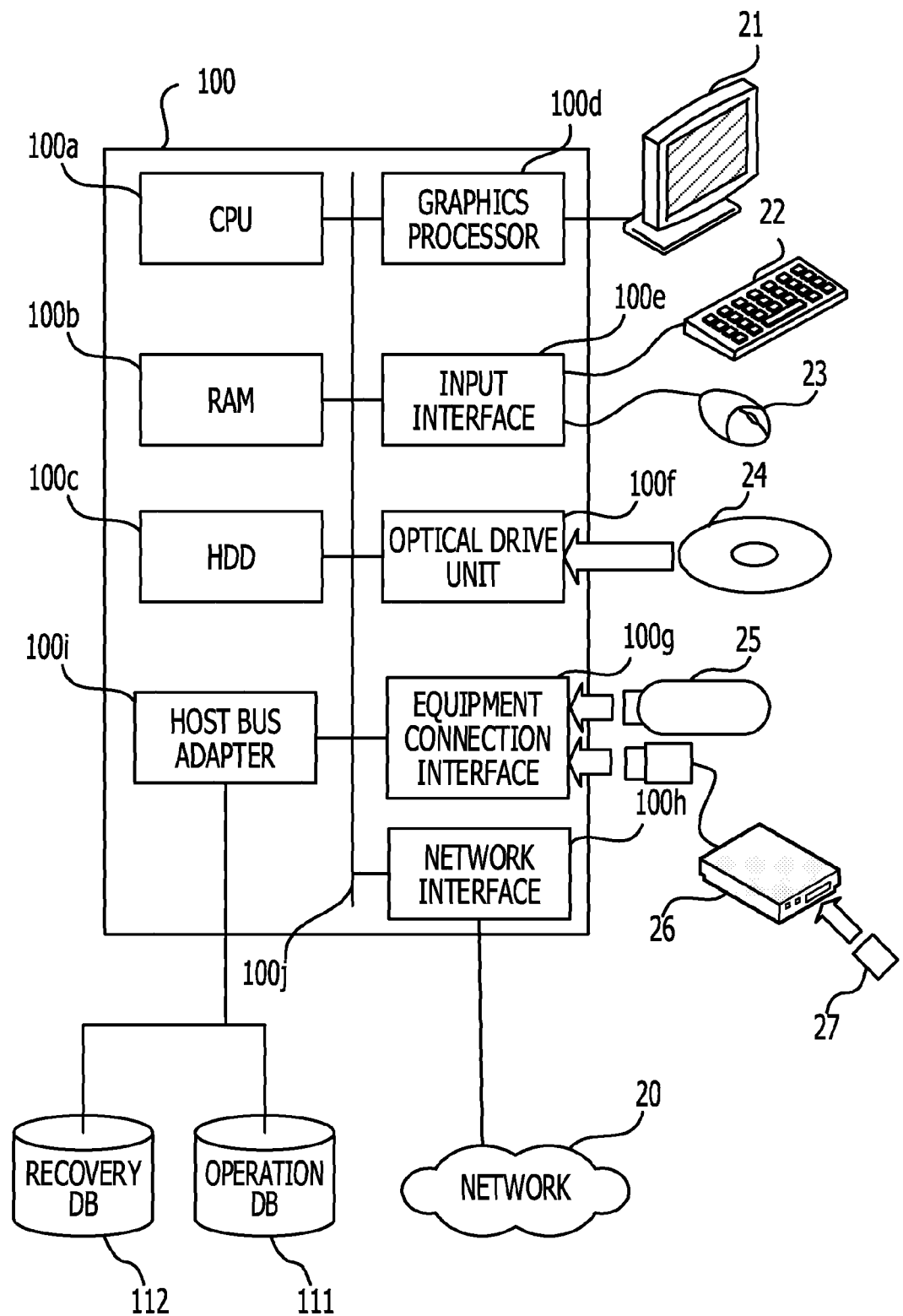
FIG. 5 is a block diagram illustrating an exemplary hardware configuration of a DB server according to the second embodiment.

FIG. 5 is a block diagram illustrating an exemplary hardware configuration of a DB server according to the second embodiment.

In the DB server 100, a CPU 100a controls the entire apparatus. The CPU 100a is coupled to a random-access memory (RAM) 100b and peripheral devices via a bus 100j. The number of CPUs included in the DB server 100 is not limited to one, and multiple CPUs may be included in the DB server 100. In the case where the DB server 100 includes multiple CPUs, the CPUs cooperate with each other so as to control the entire apparatus.

The RAM 100b is used as a main storage of the DB server 100. The RAM 100b temporarily stores at least some of programs of the operating system (OS) and application programs which are executed by the CPU 100a. The RAM 100b stores various data for processes performed by the CPU 100a.

The peripheral devices coupled to the bus 100j are, for example, an HDD 100c, a graphics processor 100d, an input interface 100e, an optical drive unit 100f, an equipment connection interface 100g, a network interface 100h, and a host bus adapter 100i.

The HDD 100c magnetically writes/reads data into/from an incorporated disk. The HDD 100c is used as an auxiliary storage of the DB server 100. The HDD 100c stores programs of the OS, application programs, and various data. For example, a semiconductor memory device such as a flash memory may be used as an auxiliary storage.

The graphics processor 100d is coupled to a monitor 21. The graphics processor 100d displays images on the screen of the monitor 21 in accordance with instructions from the CPU 100a. The monitor 21 is, for example, a display apparatus using a cathode ray tube (CRT) or a liquid crystal display.

The input interface 100e is coupled to a keyboard 22 and a mouse 23. The input interface 100e transmits a signal received from the keyboard 22 or the mouse 23 to the CPU 100a. The mouse 23 is an exemplary pointing device, and other pointing devices may be used. Other pointing devices include a touch panel, a tablet, a touchpad, and a track ball.

The optical drive unit 100f uses, for example, a laser beam to read out data recorded on an optical disc 24. The optical disc 24 is a portable recording medium on which data is recorded so as to be read out through reflection of light. The optical disc 24 is, for example, a digital versatile disc (DVD), a DVD-RAM, a compact disc read only memory (CD-ROM), or a CD-recordable (R)/rewritable (RW).

The equipment connection interface 100g is a communication interface for connecting a peripheral device to the DB server 100. For example, a memory device 25 and a memory reader/writer 26 may be coupled to the equipment connection interface 100g. The memory device 25 is a recording medium on which communication functions for the equipment connection interface 100g are installed. The memory reader/writer 26 is an apparatus which writes data into a memory card 27 or reads out data from the memory card 27. The memory card 27 is a card type recording medium.

The network interface 100h is coupled to the network 20. The network interface 100h receives/transmits data from/to other servers or communication equipment via the network 20.

The host bus adapter 100i is an interface which performs data access to an HDD in which the operation DB 111 or the recovery DB 112 is constructed. The host bus adapter 100i writes/reads data into/from the operation DB 111 or the recovery DB 112 on an object-by-object basis in accordance with instructions from the CPU 100a.

The hardware configuration described above may be used to achieve functions of the second embodiment. FIG. 5 illustrates the hardware configuration of the DB server 100. Other DB servers 200, 300, 400, 500, and so forth, and server 600 may have a similar hardware configuration. The computers 2 to 5 in the first embodiment may have a hardware configuration similar to that of the DB server 100 illustrated in FIG. 5.

The DB server 100 executes programs recorded on a computer-readable recording medium, thereby achieving the functions of the second embodiment. The programs describing processes performed by the DB server 100 may be recorded on various recording media. For example, the programs performed by the DB server 100 may be stored in the HDD 100c. The CPU 100a loads at least some of the programs in the HDD 100c onto the RAM 100b, and executes the loaded programs. The programs executed by the DB server 100 may be recorded on a portable recording medium, such as the optical disc 24, the memory device 25, or the memory card 27. The programs stored in a portable recording medium are installed into the HDD 100c, for example, through the control performed by the CPU 100a, and are then made executable. The CPU 100a may directly read out the programs from a portable recording medium and may execute the read-out programs. A recording medium on which the programs are recorded does not include a temporary propagation signal itself.

When the programs are distributed, for example, a portable recording medium, such as the optical disc 24, the memory device 25, or the memory card 27, on which the programs are recorded is released onto the market. The programs may be stored in a storage device of a server, and may be transferred from the server to the DB server 100 via the network 20. When the DB server 100 obtains the programs via the network 20, for example, the DB server 100 stores the programs into the HDD 100c. Then, the CPU 100a of the DB server 100 executes the programs in the HDD 100c. Every time some of the programs are transferred from another server, the DB server 100 may execute processes according to the received programs at once.

A functional block diagram illustrating the functions provided for the DB server 100 having such a hardware configuration will be described.

Figure 6:
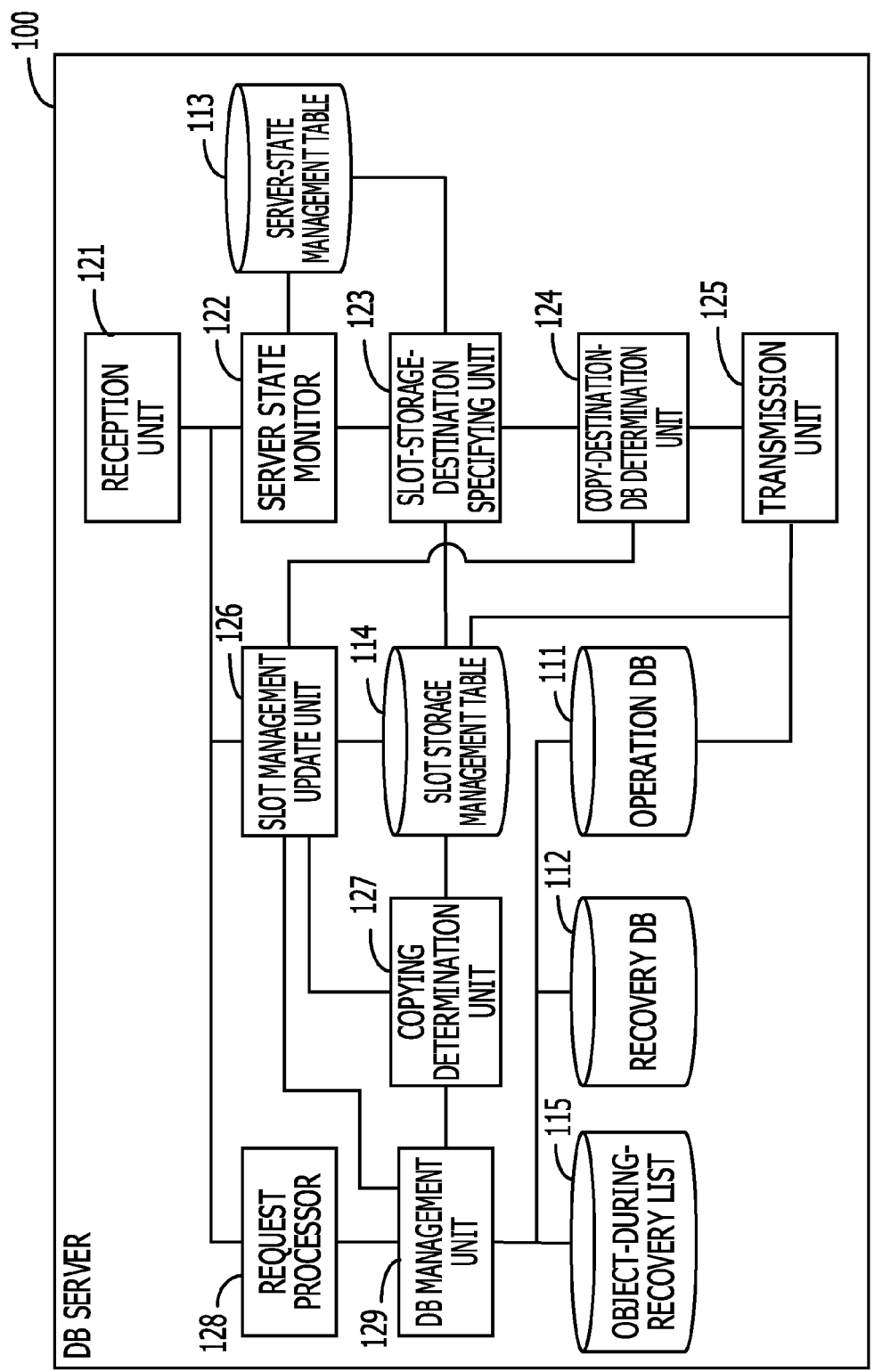
FIG. 6 is a block diagram illustrating an exemplary functional configuration of a DB server according to the second embodiment.

FIG. 6 is a block diagram illustrating an exemplary functional configuration of a DB server according to the second embodiment.

The DB server 100 includes the operation DB 111 and the recovery DB 112

The operation DB 111 is a database storing data used by the server 600. The operation DB 111 stores data on an object-by-object basis. The operation DB 111 stores data in a data array which enables sequential readout.

The recovery DB 112 is a database used when a recovery process is performed. Like the operation DB 111, the recovery DB 112 stores data on an object-by-object basis. The recovery DB 112 stores data in a data array which enables sequential writing.

The DB server 100 includes a server-state management table 113, a slot storage management table 114, and an object-during-recovery list 115. The server-state management table 113, the slot storage management table 114, and the object-during-recovery list 115 are stored, for example, in the RAM 100b or the HDD 100c.

The tables will be described by using FIGS. 7 to 9.

Figure 7:
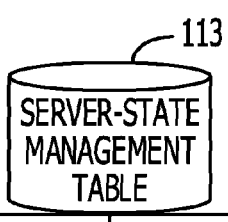
FIG. 7 is a diagram illustrating an exemplary server-state management table according to the second embodiment.

FIG. 7 is a diagram illustrating an exemplary server-state management table according to the second embodiment. The server-state management table 113 records server state information which describes operating conditions of the DB servers 200, 300, 400, 500, and so forth which are DB servers other than the DB server 100. For example, in the server-state management table 113, the operating conditions of the servers are stored in such a manner that the operating conditions are associated with the identifiers of the DB servers 200, 300, 400, 500, and so forth. In the example in FIG. 7, "1" which indicates that a server normally operates is recorded for each of the servers having the identifiers "B", "C", "E", and "F", whereas "0" which indicates that a server has a failure is recorded for the server having the identifier "D".

The DB server 100 updates the server-state management table 113 as described above every time the DB server 100 receives, from another server, a signal indicating a notification that the server normally operates. When the DB server 100 detects a server from which a signal indicating a notification that the server normally operates has not been received, the DB server 100 updates the server-state management table 113 so that the operating condition of the server is changed to "0" which indicates that the server is failure.

Figure 8:
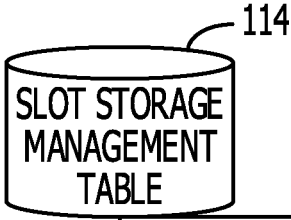
FIG. 8 is a diagram illustrating an exemplary slot storage management table according to the second embodiment.

FIG. 8 is a diagram illustrating an exemplary slot storage management table according to the second embodiment. The slot storage management table 114 stores slot storage information which indicates storage destinations of the slots in the server system 10. A slot is a unit with which redundancy is achieved, and includes multiple objects. For example, the number of slots is fixed. In the example in FIG. 8, the number of slots is 64. An object is classified into either one of the slots in accordance with a certain rule. The certain rule describes that, for example, an object is to belong to a slot whose number is equal to a remainder obtained by dividing the object ID by 64.

In the example in FIG. 8, a slot 3 is stored in the server B as primary data, and is stored in the server F as backup data. A slot 62 is stored in the server F as primary data, and is stored in the server C as backup data.

Each of the DB servers 200, 300, 400, 500, and so forth which are DB servers other than the DB server 100 has a slot storage management table similar to that in FIG. 8. The data in the slot storage management tables is common in all of the servers. For example, the DB servers 100, 200, 300, 400, 500, and so forth regularly communicate with each other (for example, at the heartbeat timing) to maintain the slot storage management tables that are to be the same.

Figure 9:
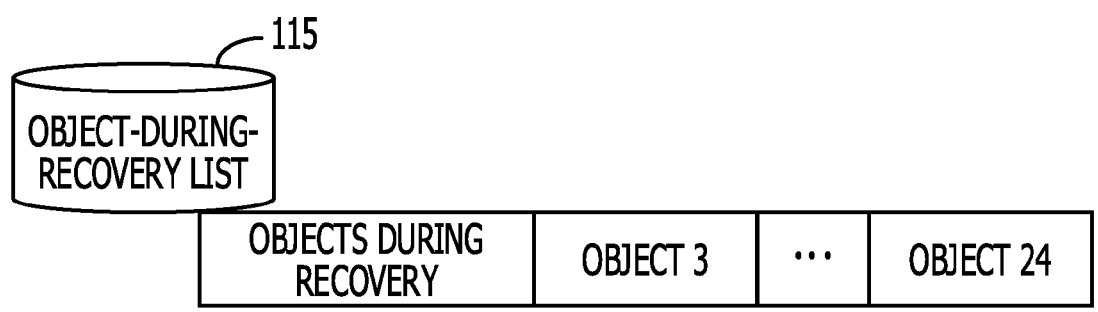
FIG. 9 is a diagram illustrating an exemplary object-during-recovery list according to the second embodiment.

FIG. 9 is a diagram illustrating an exemplary object-during-recovery list according to the second embodiment. The object-during-recovery list 115 stores the identifier information of the objects that are stored in the recovery DB 112 of the DB server 100 during a recovery process. For example, in the case illustrated in FIG. 9, the DB server 100 has written objects 3, 24, and so forth into the recovery DB 112. Upon completion of a process in which the objects which are the targets for recovery are copied from the recovery DB 112 to the operation DB 111, the DB server 100 deletes the identifier information of the objects that have been copied, from the object-during-recovery list 115. In addition, in the case where the server 600 transmits a write request for an object which is being recovered, when the object is written into the operation DB 111 due to the write request, the identifier information of the object is deleted from the object-during-recovery list 115.

Referring back to FIG. 6, the DB server 100 uses the information, such as the tables illustrated in FIGS. 7 to 9, to perform a recovery process. The DB server 100 includes a reception unit 121, a server state monitor 122, a slot-storage-destination specifying unit 123, a copy-destination-DB determination unit 124, a transmission unit 125, a slot management update unit 126, a copying determination unit 127, a request processor 128, and a DB management unit 129.

The reception unit 121 receives, for example, data from other servers. The information received by the reception unit 121 includes a request to write objects, which is transmitted by the recovery process. The reception unit 121 also receives an access request to write or read out an object, which is transmitted from the server 600.

The server state monitor 122 monitors whether other DB servers normally operate or have a failure. For example, the server state monitor 122 monitors whether or not a signal (heartbeat) indicating that a server normally operates has been regularly received from each of the other servers. The server state monitor 122 regularly transmits information indicating that the DB server 100 normally operates, to the other servers.

The server state monitor 122 regularly (for example, at the heartbeat timing) transmits normality-or-failure information indicating which server among the other servers is a server whose normal operation has been confirmed by the DB server 100 and which server is a server whose normal operation has not been confirmed, to all of the other DB servers. A server whose normal operation has been confirmed is a server from which a heartbeat is regularly received. A server whose normal operation has not been confirmed is a server from which a heartbeat has not been received for a certain time period or longer. Similarly, the server state monitor of each of the other servers transmits normality-or-failure information. The server state monitor 122 summarizes the normality-or-failure information obtained through the monitoring performed by the server state monitor 122 itself and the normality-or-failure information received from the other servers, on a server-by-server basis. The server state monitor 122 determines that a server which is determined by more than half of the servers to be a server whose normal operation has not been confirmed has a failure, on the basis of the summarized result. When the server state monitor 122 determines that a certain server has a failure, the server state monitor 122 immediately notifies all of the other DB servers of the failure of the certain server. Thus, information about the failure of the server is shared by all of the servers.

The server state monitor 122 updates the state information of a server that is determined to has a failure, in the server-state management table 113 with information indicating the failure state. When the server state monitor 122 receives a heartbeat from the server that has been in the failure state, the server state monitor 122 updates the operating condition information of the server in the server-state management table 113 with information indicating that the server normally operates.

The slot-storage-destination specifying unit 123 refers to the slot storage management table 114 to determine which slots are stored in the failure server that is found through the monitoring performed by the server state monitor 122. In addition, the slot-storage-destination specifying unit 123 specifies servers which store the same slots (that is, redundant data) as those stored in the failure server. For example, when a slot stored in the failure server is primary data, a server which stores the backup data of the slot is specified. When a slot stored in the failure server is backup data, a server which stores the primary data of the slot is specified.

When the server specified by the slot-storage-destination specifying unit 123 is the DB server 100 itself, the copydestination-DB determination unit 124 determines a DB server to which the slot stored in the operation DB 111 is to be copied. For example, the copy-destination-DB determination unit 124 determines a server by randomly selecting a DB server from the DB servers other than the DB server 100 in the server system 10. The copy-destination-DB determination unit 124 notifies the slot management update unit 126 and the transmission unit 125 of a request to update the slot storage information so that the DB server determined as a copy-destination server stores the slot which is a slot of the failure DB server and which is stored in the operation DB 111 of the DB server 100 as redundant data.

The transmission unit 125 transmits the slot of the failure DB server which is stored in the operation DB 111 of the DB server 100 to the DB server determined as a copy-destination server by the copy-destination-DB determination unit 124. The transmission unit 125 transmits the request to update the slot storage information, which is notified by the copy-destination-DB determination unit 124, to all of the other DB servers.

The slot management update unit 126 updates the slot storage management table 114 on the basis of a request to update slot storage information which is notified from each of the other DB servers and the copy-destination-DB determination unit 124.

The copying determination unit 127 refers to the data in the slot storage management table 114 which is updated by the slot management update unit 126, and determines whether or not the DB server 100 itself is set as a copy destination for a slot of the failure DB server. When the DB server 100 itself is set as a copy destination for the failure DB server, the copying determination unit 127 notifies the DB management unit 129 of a request to create a recovery DB.

The request processor 128 obtains a write or readout request from the reception unit 121. The request processor 128 determines whether the write or readout request is a copy request due to the recovery process or an access request to write or read out data which is transmitted from the server 600. For example, copying during the recovery is performed by using a command different from that used for the typical write access performed by clients and other servers. In this case, the request processor 128 may select a destination DB in accordance with the command type. The request processor 128 notifies the DB management unit 129 of a request to write or read out an object in accordance with the determination result.

The DB management unit 129 manages the operation DB 111 and the recovery DB 112. The DB management unit 129 has a fast-write database management system (DBMS) and a fast-read DBMS. The DB management unit 129 manages the operation DB 111 by using the fast-read DBMS, and manages the recovery DB 112 by using the fast-write DBMS. For example, the DB management unit 129 writes/reads objects into/from the operation DB 111 or the recovery DB 112 in accordance with a request to write/read a slot which is transmitted from the request processor 128. The DB management unit 129 creates the recovery DB 112 on an unused HDD in accordance with a request to create the recovery DB 112 which is transmitted from the copying determination unit 127. At that time, the DB management unit 129 constructs a DB having a fast-write data structure as a recovery DB. Upon reception of objects included in the slot to be recovered, the DB management unit 129 stores the objects into the recovery DB 112. Upon completion of the writing of objects in all of the slots to be copied to the DB server 100 into the recovery DB 112, the DB management unit 129 copies the objects written into the recovery DB 112 to the operation DB 111, and initializes the recovery DB 112.

The DB management unit 129 uses the object-during-recovery list 115 to manage information indicating whether or not an object which belongs to a slot to be recovered is being recovered. For example, when the DB management unit 129 stores an object included in a slot to be copied, into the recovery DB 112, the DB management unit 129 stores the identifier information of the stored object into the object-during-recovery list 115. The DB management unit 129 deletes the identifier information of the object copied from the recovery DB 112 to the operation DB 111, from the object-during-recovery list 115.

The DB management unit 129 grasps whether or not an object included in a slot to be recovered is being recovered, on the basis of the object-during-recovery list 115. When a request to read out an object that is being recovered is transmitted from the server 600, the DB management unit 129 reads the object in accordance with the request from the recovery DB 112. When a request to write an object that is being recovered is transmitted from the server 600, the DB management unit 112 writes the object into the operation DB 111, and deletes the identifier information of the object from the object-during-recovery list 115.

The lines with which the components are coupled to each other in FIG. 6 indicate some of communication paths. Communication paths other than the communication paths illustrated in FIG. 6 may be provided. FIG. 6 illustrates functions of the DB server 100. Other DB servers 200, 300, 400, 500, and so forth also have functions similar to those of the DB server 100. The DB management unit 129 is an exemplary component encompassing the functions of the storing unit 2c, the copying unit 2d, and the data update unit 2e according to the first embodiment illustrated in FIG. 1.

An exemplary way in which pieces of data are transferred when a failure occurs in a DB server in the server system 10 including the DB server 100 having the above-described functions will be described by using FIG. 10.

Figure 10:
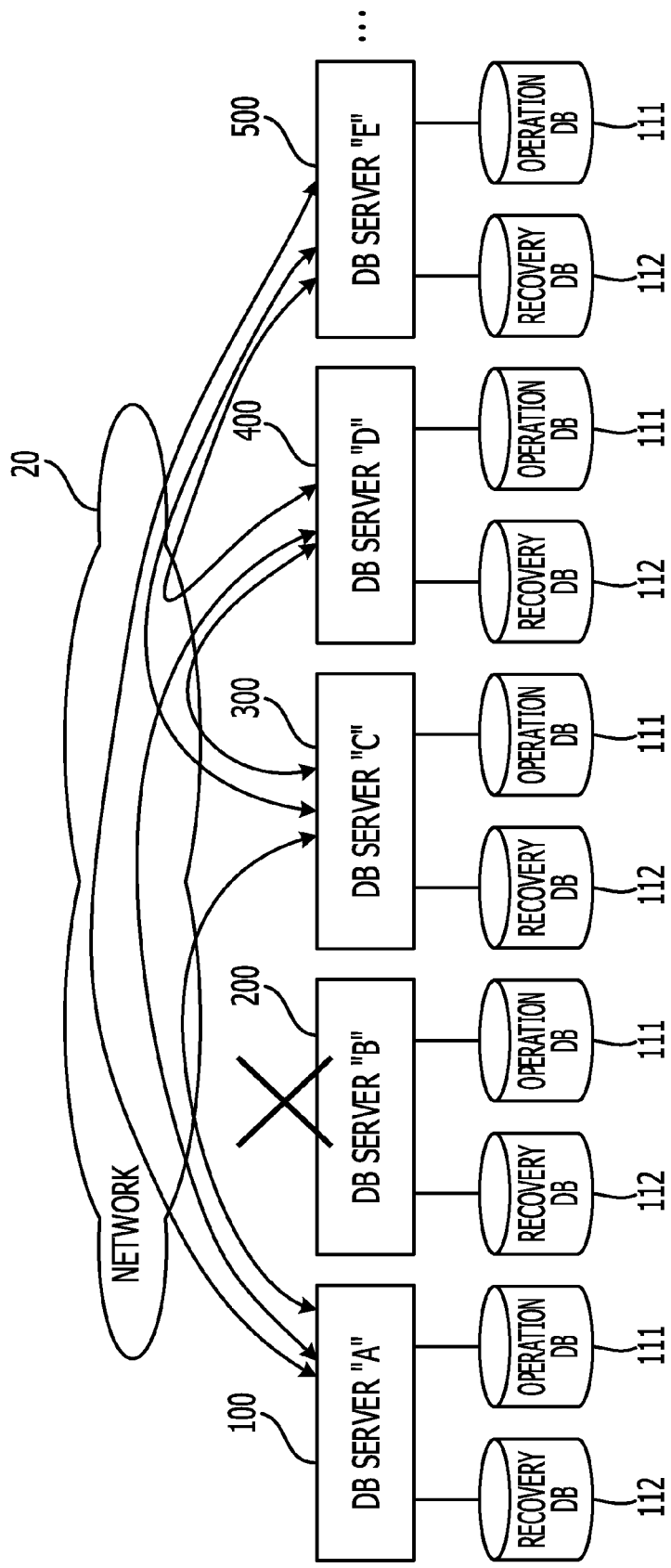
FIG. 10 is a diagram illustrating an exemplary way in which pieces of data are transferred in a server system according to the second embodiment.

FIG. 10 is a diagram illustrating an exemplary way in which pieces of data are transferred in the server system according to the second embodiment.

In the server system 10, as described above, DB servers are coupled via the network 20 so as to communicate with each other.

In this configuration, for example, assume that a failure occurs in the DB server 200 among the DB servers 100, 200, 300, 400, 500, etc, as illustrated in FIG. 10. In this case, one DB server among other DB servers 100, 300, 400, 500, and so forth which store the slots stored in the DB server 200 serves as a copy source, and another server serves as a copy destination. Thus, the objects included in the slots stored in the DB server 200 are copied. In this manner, the objects included in the slots are transferred among the DB servers 100, 300, 400, 500, and so forth, thereby achieving rapid restore of the redundancy of the slots stored in the DB server 200.

Processes in which the DB server 100 serves as a copy source and a copy destination in the above-described server system 10 will be described. An example will be described below in which a failure occurs in the DB server 200.

A process in which the DB server 100 serves as a copy source and transmits a notification that a slot is to be copied, to the DB server 300 will be described by using FIG. 11.

Figure 11:
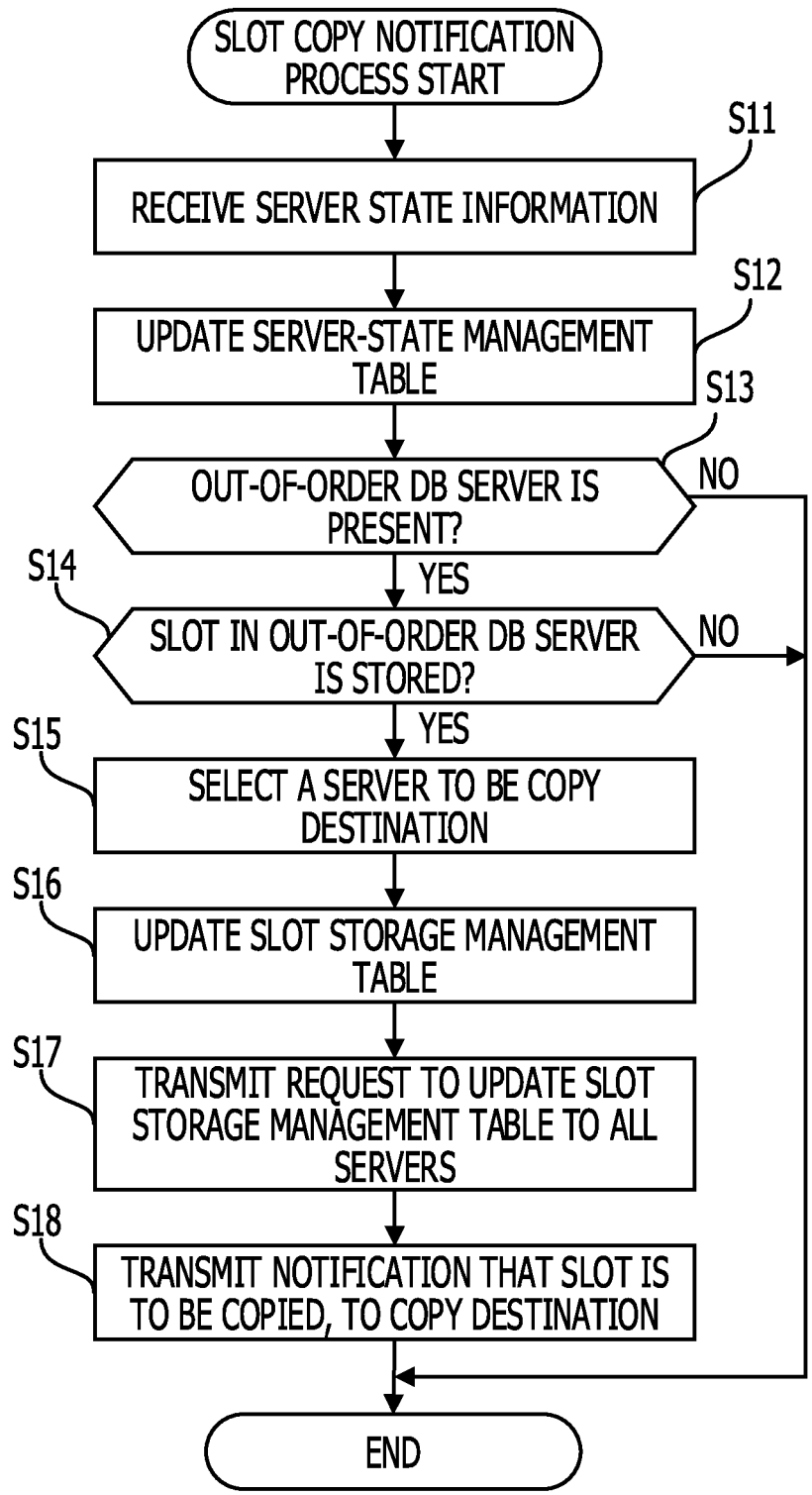
FIG. 11 is a flowchart of an exemplary procedure for a notification that a slot is to be copied, in a DB server according to the second embodiment.

FIG. 11 is a flowchart of an exemplary procedure for a notification that a slot is to be copied, in a DB server according to the second embodiment.

In S11, in the DB server 100, the reception unit 121 receives server state information representing an operating condition from another DB server.

In S12, the server state monitor 122 updates the server-state management table 113 on the basis of the server state information received by the reception unit 121.

In S13, the server state monitor 122 determines whether or not a failure DB server is present among the other DB servers by referring the updated server-state management table 113.

If a failure DB server is present among the other DB servers (for example, the DB server 200), the DB server 100 performs the process in S14. If such a DB server is not present, the copy slot notification process is ended.

In S14, the slot-storage-destination specifying unit 123 refers to the slot storage management table 114, and specifies DB servers storing the slots stored in the failure DB server 200 which is found through the monitoring performed by the server state monitor 122.

If one of the specified DB servers is the DB server 100, the DB server 100 performs the process in S15. If the specified DB servers are other than the DB server 100, the copy slot notification process is ended.

In S15, the copy-destination-DB determination unit 124 randomly selects another DB server, for example, the DB server 300, which is to be a copy destination for the slot stored in the operation DB 111 of the DB server 100.

In S16, the copy-destination-DB determination unit 124 notifies the slot management update unit 126 and the transmission unit 125 of a request to update the slot storage information so that the DB server 300 which is selected as a copy destination in S15 stores the slot which is a slot of the failure DB server 200 and which is stored in the DB server 100.

The slot management update unit 126 updates the slot storage management table 114 on the basis of the update request received from the copy-destination-DB determination unit 124.

In S17, the transmission unit 125 transmits the request to update the slot storage information which is notified from the copy-destination-DB determination unit 124, to all of the DB servers 300, 400, 500, and so forth other than the DB server 100

In S18, the transmission unit 125 transmits a notification that the slot is to be copied, as well as the objects included in the slot of the failure DB server 200, to the DB server 300 which is selected as a copy destination.

Every time server state information is received, the above-described process is performed. Thus, a request to update the server state information, a slot stored in the failure DB server 200, and a notification that the slot is to be copied are transmitted from the DB server 100 to the DB server 300.

The copy slot notification process as illustrated in FIG. 11 is performed on all of the DB servers that store the same slots as those stored in the failure DB server 200. Then, a recovery process performed by the DB server 100 when the DB server 100 receives a notification that a slot is to be copied will be described by using FIG. 12.

Figure 12:
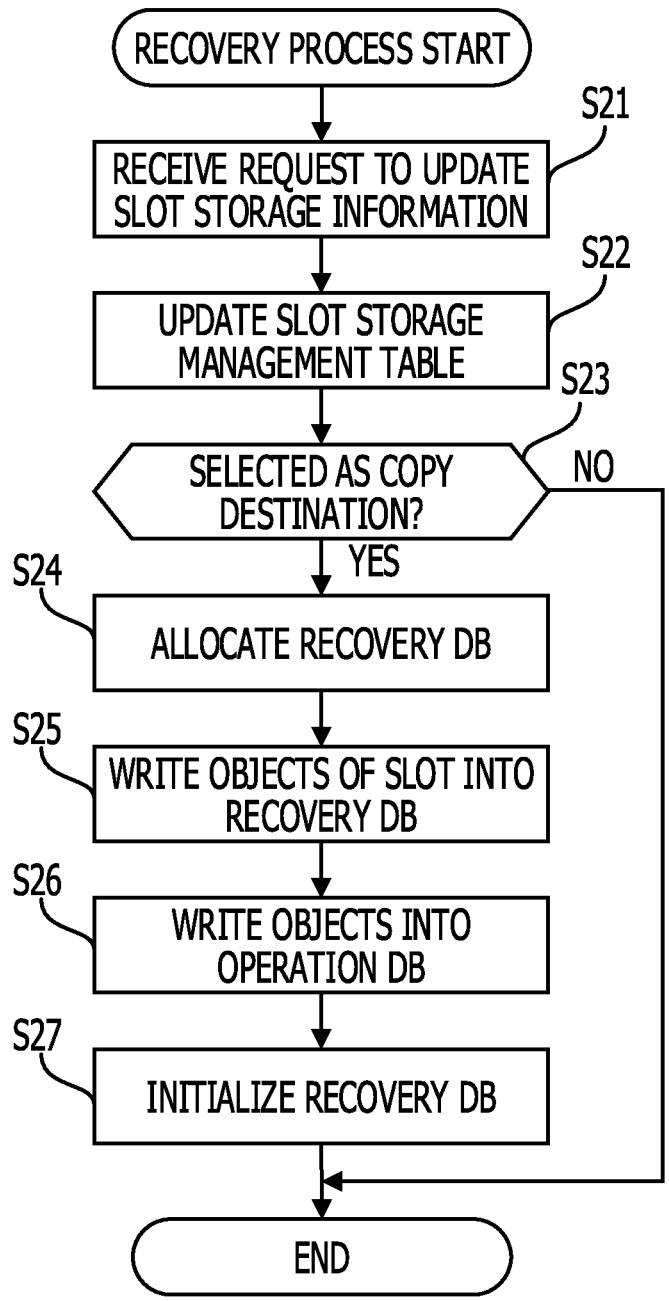
FIG. 12 is a flowchart of an exemplary recovery procedure in a DB server according to the second embodiment.

FIG. 12 is a flowchart of an exemplary recovery procedure in a DB server according to the second embodiment.

In S21, the reception unit 121 of the DB server 100 receives a request to update the slot storage information from the DB server 300. At that time, multiple DB servers 400, 500, and so forth may notify the DB server 100 of a request to update the slot storage information. Accordingly, the reception unit 121 waits for reception of a request to update the slot storage information from other DB servers, for example, for a certain time period after the first reception of a request to update the slot storage information, and then starts the process in the subsequent S22.

In S22, the slot management update unit 126 updates the slot storage management table 114 on the basis of the slot storage information received from the other DB servers.

In S23, the copying determination unit 127 refers to the updated slot storage management table 114, and determines whether or not the DB server 100 itself is selected as a copy destination for a slot.

If the DB server itself 100 is selected as a copy destination for a slot, the DB server 100 performs the process in S24. If the DB server 100 is not selected as a copy destination for a slot, the recovery process is ended.

In S24, the DB management unit 129 allocates the recovery DB 112 in which the writing speed is set higher, in an unused HDD.

In S25, the DB management unit 129 writes the objects of the slot which are transmitted from the DB server 300 into the recovery DB 112. At that time, the DB management unit 129 registers the identifier information of the written objects in the object-during-recovery list 115.

In S26, upon completion of the copying of the objects of the slot to be recovered to the recovery DB 112, the DB management unit 129 writes the objects stored in the recovery DB 112 into the operation DB 111. At that time, the DB management unit 129 deletes the identifier information of the written objects from the object-during-recovery list 115.

In S27, upon completion of the writing of the objects of the slot to be recovered into the operation DB 111, the DB management unit 129 initializes the recovery DB 112. For example, when the identifier information of all of the objects is deleted from the object-during-recovery list 115, the DB management unit 129 determines that the writing of the objects of the slot to be recovered into the operation DB 111 is completed. In the initialization process, all of the objects written into the recovery DB 112 are deleted.

Every time a request to update the slot storage information is transmitted, the above-described process is performed. Thus, the same slots as those stored in the failure DB server 200 are rapidly stored into the recovery DBs 112, 312, 412, 512, and so forth of the other DB servers 100, 300, 400, 500, and so forth. As a result, the redundancy of the slots is rapidly restored. On top of that, after completion of the recovery process, the recovery DB is initialized. Therefore, after that, the HDD used as the recovery DB may be used for other usage, resulting in effective utilization of HDD resources.

A process performed when the DB server 100 receives a request to write an object included in a slot to be recovered from the server 600 will be described by using FIG. 13.

Figure 13:
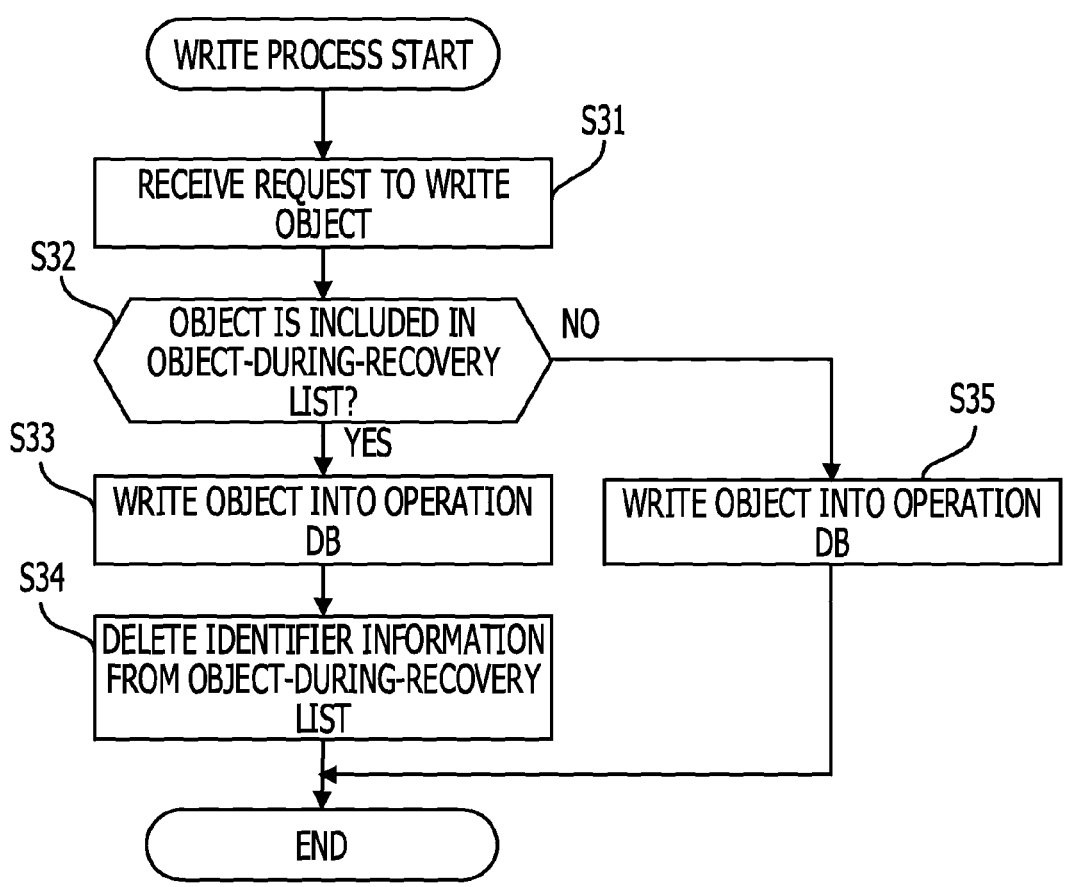
FIG. 13 is a flowchart of an exemplary write procedure in a DB server according to the second embodiment.

FIG. 13 is a flowchart of an exemplary write procedure in a DB server according to the second embodiment.

In S31, the reception unit 121 of the DB server 100 receives a request to write an object included in the same slot as that stored in the DB server 200 from the server 600.

In S32, the request processor 128 determines that a write request has been received from the server 600, and notifies the DB management unit 129 of a request to determine whether or not the object to be written is included in the object-during-recovery list 115.

The DB management unit 129 determines whether or not the object to be written is included in the object-during-recovery list 115.

If the object is included in the object-during-recovery list 115, the DB server 100 performs the process in S33. If the object is not included in the object-during-recovery list 115, the DB server 100 performs the process in S35.

In S33, the DB management unit 129 writes the object to be written into the operation DB 111. At that time, the recovery DB 112 stores the object to be written.

In S34, upon completion of the writing of the object to be written into the operation DB 111, the DB management unit 129 deletes the identifier information of the written object from the object-during-recovery list 115. The DB management unit 129 deletes the object in the recovery DB 112 which corresponds to the written object. After that, the write process is ended.

In S35, the DB management unit 129 writes the object to be written into the operation DB 111. After that, the write process is ended.

Every time a request to write an object is received from the server 600, the above-described process is performed.

A process performed in the DB server 100 when a request to read an object included in a slot to be recovered is received from the server 600 will be described by using FIG. 14.

Figure 14:
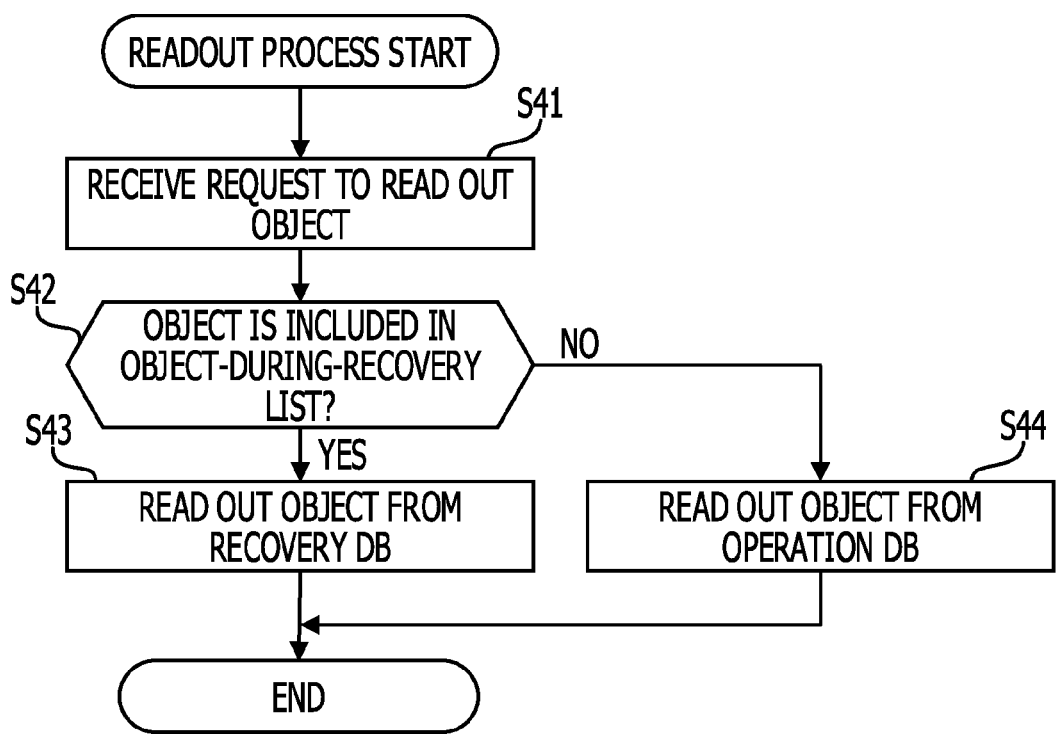
FIG. 14 is a flowchart of an exemplary readout procedure in a DB server according to the second embodiment.

FIG. 14 is a flowchart of an exemplary readout procedure in a DB server according to the second embodiment.

In S41, the reception unit 121 of the DB server 100 receives a request to read out the same object as that stored in the DB server 200 from the server 600.

In S42, the request processor 128 determines that a readout request has been received from the server 600, and notifies the DB management unit 129 of a request to determine whether or not the object to be read out is included in the object-during-recovery list 115.

The DB management unit 129 determines whether or not the object to be read out is included in the object-during-recovery list 115.

If the object is included in the object-during-recovery list 115, the DB server 100 performs the process in S43. If the object is not included in the object-during-recovery list 115, the DB server 100 performs the process in S44.

In S43, the DB management unit 129 reads out the object to be read out from the recovery DB 112. After that, the readout process is ended.

In S44, the DB management unit 129 reads out the object to be read out from the operation DB 111. After that, the readout process is ended.

Every time a request to read out an object is received from the server 600, the above-described process is performed, and a read-out object is transmitted to the server 600. As described with reference to FIG. 12, a slot stored in the failure DB server 200 is rapidly stored into the recovery DB of another DB server. Therefore, during the above-described readout process, no data loss occurs for a request to read out an object included in a slot to be recovered, enabling the object to be read out normally.

As described above, according to the second embodiment, when the DB server 100 receives the same slot as that stored in the failure DB server 200, the DB server 100 stores the received slot in the recovery DB 112 which enables more efficient writing than the operation DB 111. Then, the DB server 100 copies the slot stored in the recovery DB 112 to the operation DB 111.

Thus, a slot stored in the failure DB server 200 is rapidly stored into the recovery DB of another DB server, resulting in rapid restore of redundancy of a slot. This suppresses the occurrence of data loss in a readout access to an object which is performed by the server 600, achieving suppression of reduction in reliability.

Third Embodiment

According to a third embodiment, multiple HDDs are separately prepared. When a recovery process is to be performed, the prepared HDDs are coupled to servers.

Figure 15:
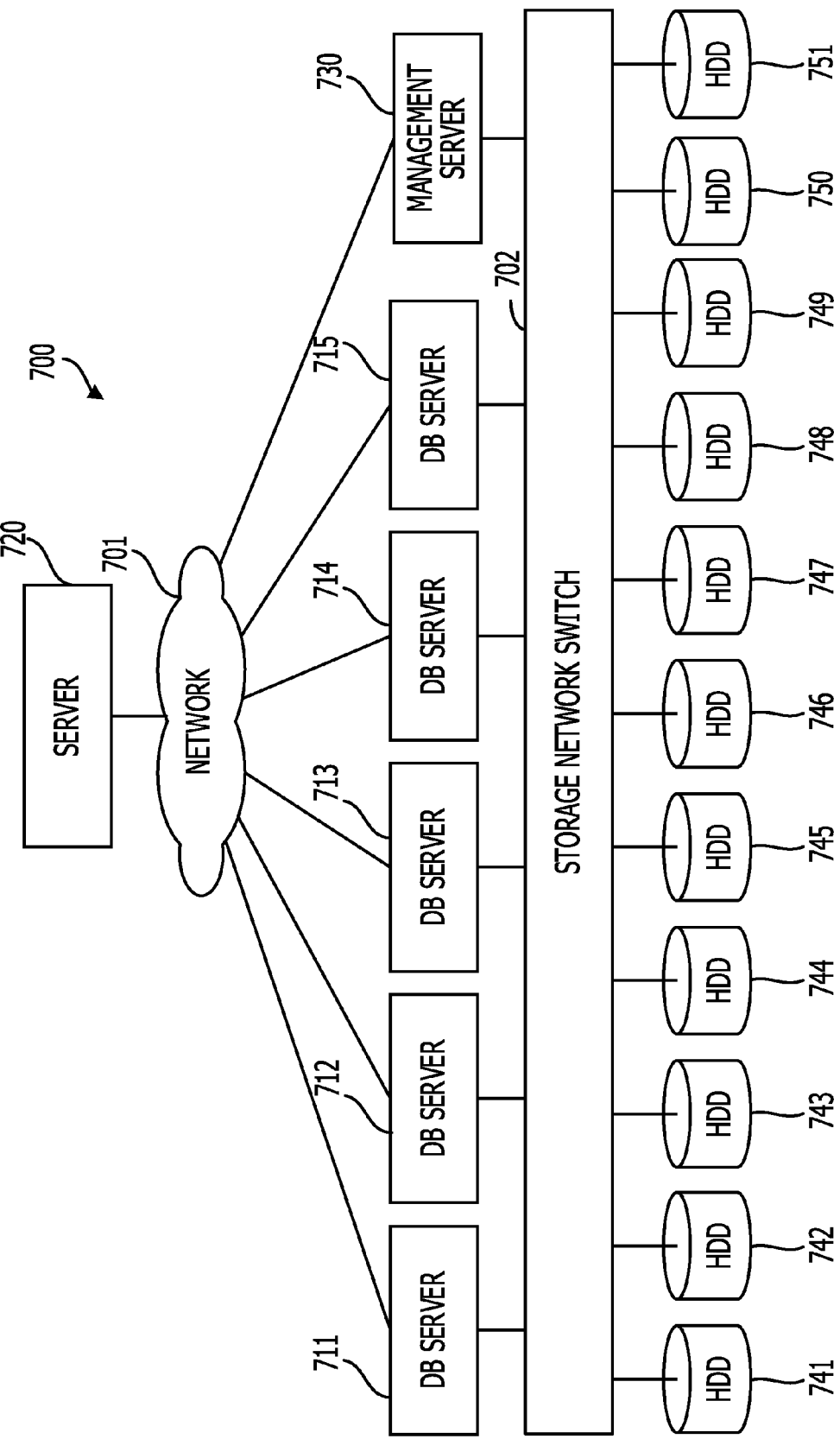
FIG. 15 is a diagram illustrating an exemplary server system according to a third embodiment.

FIG. 15 is a diagram illustrating an exemplary server system according to the third embodiment. In a server system 700 illustrated in FIG. 15, DB servers 711 to 715, a server 720, and a management server 730 are coupled via a network 701. The DB servers 711 to 715 and the management server 730 are coupled to HDDs 741 to 751 via a storage network switch 702. The storage network switch 702 is, for example, a storage area network (SAN) switch.

The DB servers 711 to 715 have the same functions as those of the DB server 100 illustrated in the second embodiment, and have a function of transmitting a request to allocate an HDD, to the management server 730 when a failure of another DB server is detected. The server 720 has the same function as that of the server 600 illustrated in the second embodiment.

The management server 730 manages allocation of the HDDs 741 to 751 to the DB servers 711 to 715. A DB server to which the management server 730 allocates an HDD may use the HDD as a local HDD. For example, a DB server may use an allocated HDD as an operation DB or a recovery DB.

In the server system 700 having such a configuration, while all of the DB servers 711 to 715 normally operate, an HDD to be used as an operation DB is allocated to each of the DB servers.

Figure 16:
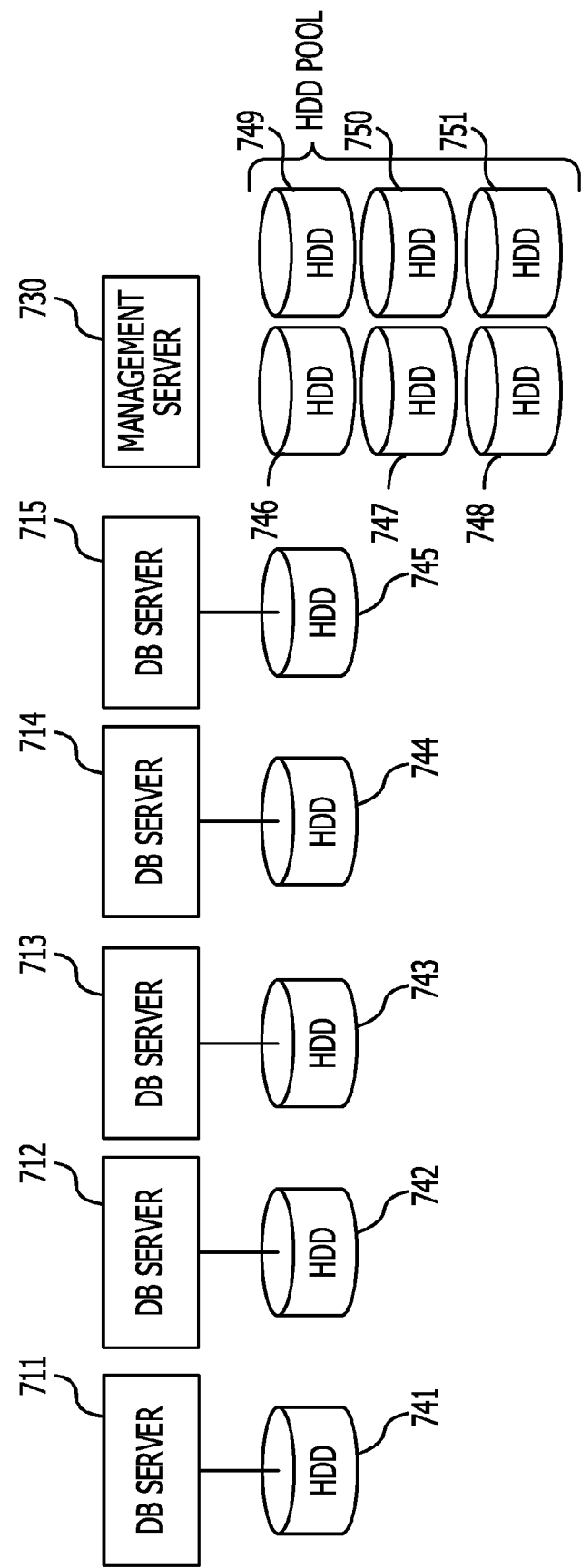
FIG. 16 is a diagram illustrating an exemplary state in which HDDs are allocated to DB servers when the DB servers normally operate in the third embodiment.

FIG. 16 is a diagram illustrating an exemplary state in which HDDs are allocated to DB servers when the DB servers normally operate in the third embodiment. In the example in FIG. 16, each of the HDDs 741 to 745 is allocated to a corresponding one of the DB servers 711 to 715. Each of the DB servers 711 to 715 constructs a database having a fast-read data structure in a corresponding one of the HDDs 741 to 745 which is allocated thereto, and uses the database as an operation DB.

The HDDs 746 to 751 which are not allocated to any of the DB servers 711 to 715 are managed as a HDD pool. The HDD pool contains unused HDDs. When the management server 730 receives a request to allocate an HDD from any of the DB servers, the management server 730 selects an HDD from the HDDs included in the HDD pool, and allocates the selected HDD to the DB server.

Assume that a failure occurs in the DB server 711 when the server system 700 operates in the state as illustrated in FIG. 16.

Figure 17:
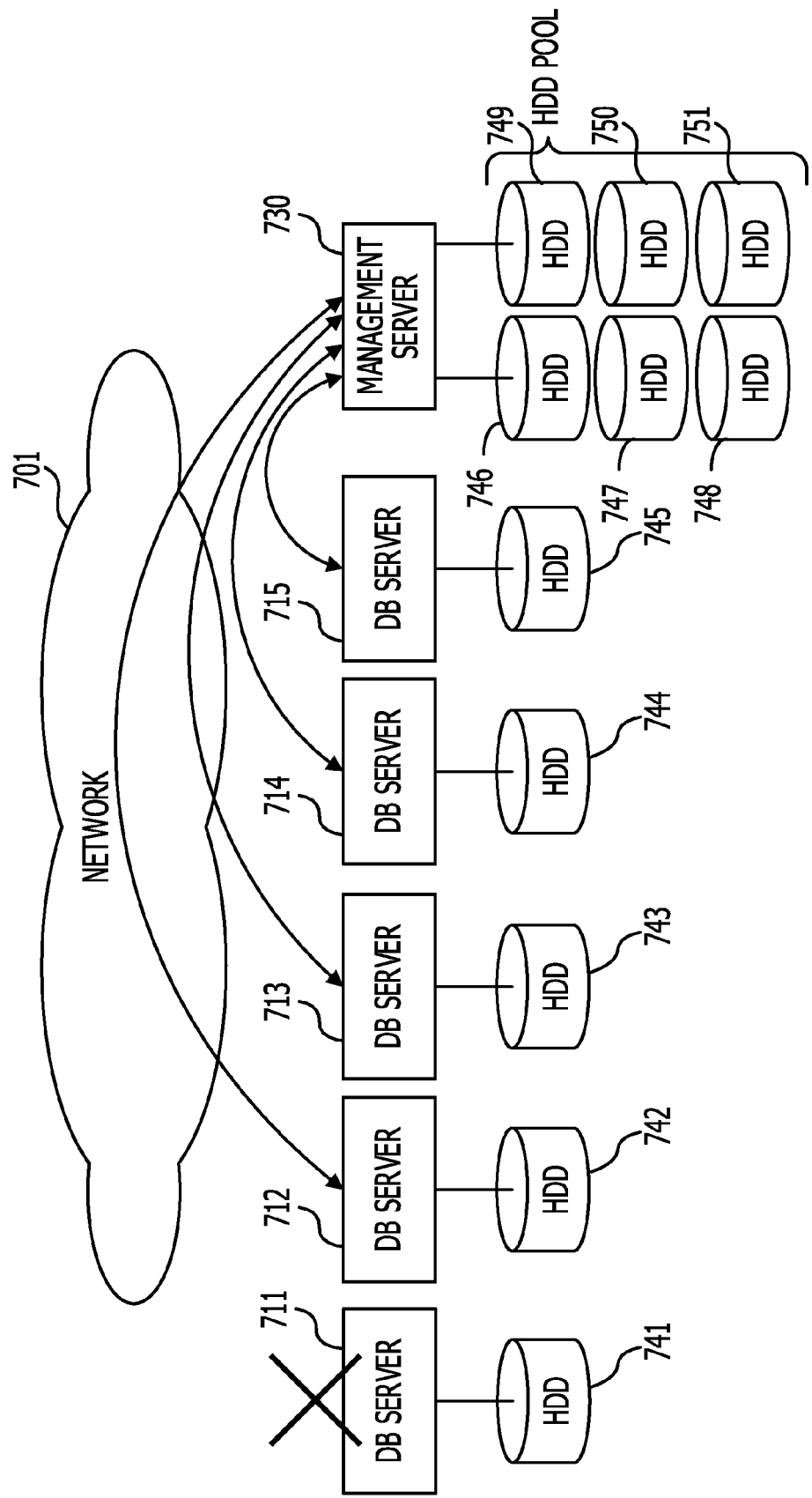
FIG. 17 is a diagram illustrating an exemplary operation state in a server system when a failure occurs in one DB server in the third embodiment.

FIG. 17 is a diagram illustrating an exemplary operation state in the server system when a failure occurs in one DB server in the third embodiment. When a failure occurs in the DB server 711, as in the second embodiment, the other DB servers 712 to 715 detect the failure of the DB server 711. At that time, in the third embodiment, each of the DB servers 712 to 715 which detect the failure of the DB server 711 transmits a request to allocate an HDD, to the management server 730. Upon reception of the requests to allocate an HDD, the management server 730 allocates an additional HDD to each of the DB servers 712 to 715.

FIG. 18 is a diagram illustrating an exemplary operation state in the server system after an additional HDD is allocated in the third embodiment. One additional HDD is allocated from the HDDs 746 to 749 to each of the DB servers 712 to 715 other than the failure DB server 711. The DB servers 712 to 715 use the allocated additional HDDs 746 to 749 as recovery DBs. That is, the DB servers 712 to 715 constructs databases having a fast-write data structure in the HDDs 746 to 749. After that, as in the second embodiment, a recovery process using a recovery DB is performed. That is, upon reception of the objects included in a slot to be recovered, each of the DB servers 712 to 715 writes the objects into a corresponding one of the HDDs 746 to 749 used as a recovery DB. Upon completion of a process in which the objects included in a slot to be recovered are transmitted between the DB servers, the DB servers 712 to 715 copy the objects in the HDDs 746 to 749 used as a recovery DB, to the HDDs 742 to 745 used as an operation DB, respectively.

Upon completion of the copying of the objects from the HDDs 746 to 749 used as a recovery DB to the HDDs 742 to 745 used as an operation DB, the DB servers 712 to 715 initialize the HDDs 742 to 745 used as a recovery DB, respectively. Then, each of the DB servers 712 to 715 transmits a request to return a corresponding one of the HDDs 746 to 749 used as a recovery DB, to the management server 730. The management server 730 releases the allocation of the HDDs 746 to 749 to the DB servers 712 to 715, and manages the HDDs 746 to 749 as HDDs included in the HDD pool.

Thus, an HDD is temporarily allocated to a DB server only when a recovery DB is used, achieving efficient utilization of HDD resources.

Other Embodiments

According to the first and second embodiments, a DB is constructed in an HDD. However, a DB may be constructed in a storage device other than an HDD. For example, a DB may be constructed in a solid state drive (SSD). Instead of an HDD, a device including a redundant array of independent disks (RAID device) may be used.

The above-described embodiments are achieved with the CPU 100a executing programs. However, some of the processes described in the programs may be replaced with an electronic circuit. For example, at least some of the above-described functions may be achieved by an electronic circuit, such as a digital signal processor (DSP), an application specific integrated circuit (ASIC), or a programmable logic device (PLD).

As described above, the exemplary embodiments are described. The configuration of the components described in the embodiments may be replaced with another configuration having similar functions. Any other components or processes may be added. In addition, any two or more configurations (features) among the above-described embodiments may be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer comprising:
a memory; and
a processor coupled to the memory and configured to:
when a first apparatus fails and data, which is same as data that has been stored in the failed first apparatus, is received from a second apparatus, store the received data into a first database having a first data structure in which reading is performed in a random access manner and writing is performed in a sequential access manner; and
copy the received data stored in the first database to a second database having a second data structure in which reading is performed in a sequential access manner and writing is performed in a random access manner,
wherein the processor is further configured to:
upon reception of an update request including new data to update a specified piece of the received data that is stored in the first database and that has not been copied to the second database, write the new data with which the specified piece of the received data is to be updated into the second database; and
delete the specified piece of the received data stored in the first database.

2. The computer according to claim 1,
wherein the processor is further configured to:
receive identifier information of the data that has been stored in the failed first apparatus from the second apparatus;
determine that reception of the data is completed when the identifier information of the data has been received; and
start copying of the received data stored in the first database to the second database when the data reception is determined to be completed.

3. The computer according to claim 1,
wherein the processor is further configured to:
construct the first database in an unused storage apparatus when failure of the failed first apparatus is detected; and
delete the first database in the storage apparatus when the copying of the data stored in the first database to the second database is completed.

4. The computer according to claim 3,
wherein the processor is further configured to:
request a management apparatus to allocate the unused storage apparatus to the computer when the failure of the failed first apparatus is detected; and
construct the first database in the unused storage apparatus allocated to the computer by the management apparatus.

5. The computer according to claim 4,
wherein the management apparatus allocates the unused storage apparatus to the computer, the unused storage apparatus being selected from a plurality of unused storage apparatuses that are managed by the management apparatus.

6. The computer according to claim 1,
wherein the processor is further configured to:
copy other pieces of the received data having not been copied to the second database to the second database after deleting the specified piece of the received data stored in the first database.

7. A data storage method executed by a computer, the data storage method comprising:
when a first apparatus fails and data, which is same as data that has been stored in the failed first apparatus, is received from a second apparatus, storing the received data into a first database having a first data structure in which reading is performed in a random access manner and writing is performed in a sequential access manner; and copying the received data stored in the first database to a second database having a second data structure in which reading is performed in a sequential access manner and writing is performed in a random access manner, wherein the method further comprises:

upon reception of an update request including new data to update a specified piece of the received data that is stored in the first database and that has not been copied to the second database, writing the new data with which the specified piece of the received data is to be updated into the second database; and deleting the specified piece of the received data stored in the first database.

8. A non-transitory computer-readable recording medium storing a program that causes a processor to execute an operation, the operation comprising:

when a first apparatus fails and data, which is same as data that has been stored in the failed first apparatus, is received from a second apparatus, storing the received data into a first database having a first data structure in which reading is performed in a random access manner and writing is performed in a sequential access manner; and copying the received data stored in the first database to a second database having a second data structure in which reading is performed in a sequential access manner and writing is performed in a random access manner, wherein the operation further comprises:

upon reception of an update request including new data to update a specified piece of the received data that is stored in the first database and that has not been copied to the second database, writing the new data with which the specified piece of the received data is to be updated into the second database; and deleting the specified piece of the received data stored in the first database.

9. The data storage method according to claim 7, further comprising:

receiving identifier information of the data that has been stored in the failed first apparatus from the second apparatus;

determining that reception of the data is completed when the identifier information of the data has been received; and copying of the received data stored in the first database to the second database when the data reception is determined to be completed.

10. The data storage method according to claim 7, further comprising:

constructing the first database in an unused storage apparatus when the failure of the failed first apparatus is detected; and deleting the first database in the storage apparatus when the copying of the data stored in the first database to the second database is completed.

11. The data storage method according to claim 10, further comprising:

requesting a management apparatus to allocate to the computer the unused storage apparatus when the failure of the failed first apparatus is detected; and constructing the first database in the unused storage apparatus allocated to the computer by the management apparatus.

12. The data storage method according to claim 11, further comprising:

allocating, by the management apparatus, the unused storage apparatus to the computer, the unused storage apparatus being selected from a plurality of unused storage apparatuses that are managed by the management apparatus.

13. The data storage method according to claim 7, further comprising copying other pieces of the received data having not been copied to the second database to the second database after deleting the specified piece of the received data stored in the first database.

14. The recording medium according to claim 8, wherein the operation further comprising:

receiving identifier information of the data that has been stored in the failed first apparatus from the second apparatus;

determining that reception of the data is completed when the identifier information of the data has been received; and copying of the received data stored in the first database to the second database when the data reception is determined to be completed.

15. The recording medium according to claim 8, wherein the operation further comprising:

constructing the first database in an unused storage apparatus when the failure of the failed first apparatus is detected; and deleting the first database in the storage apparatus when the copying of the data stored in the first database to the second database is completed.

16. The recording medium according to claim 15, wherein the operation further comprising:

requesting a management apparatus to allocate to the computer the unused storage apparatus when the failure of the failed first apparatus is detected; and constructing the first database in the unused storage apparatus allocated to the computer by the management apparatus.

17. The recording medium according to claim 16, further comprising:

allocating, by the management apparatus, the unused storage apparatus to the computer, the unused storage apparatus being selected from a plurality of unused storage apparatuses that are managed by the management apparatus.

18. The recording medium according to claim 8, wherein the operation further comprising copying other pieces of the received data having not been copied to the second database to the second database after deleting the specified piece of the received data stored in the first database.

* * * * *